April 30, 1957  D. BLITZ  2,790,969
RADIO BOMB RELEASE WITH RANGE WARNING
Filed April 28, 1945  2 Sheets-Sheet 1
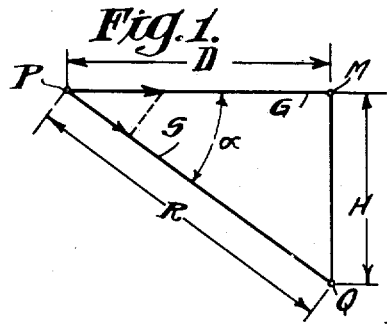
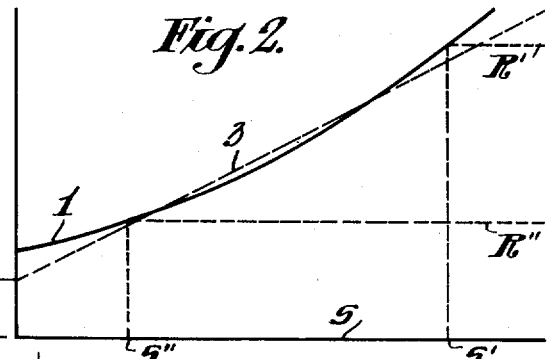
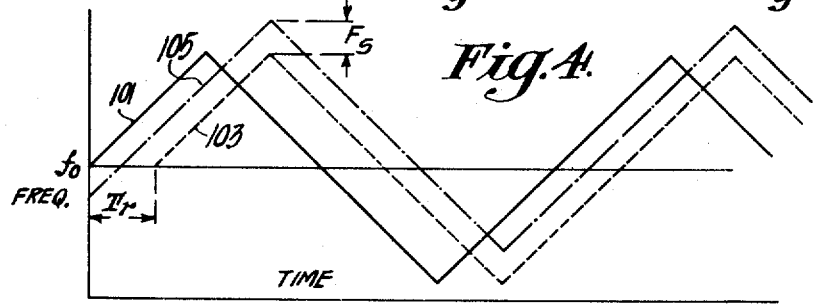
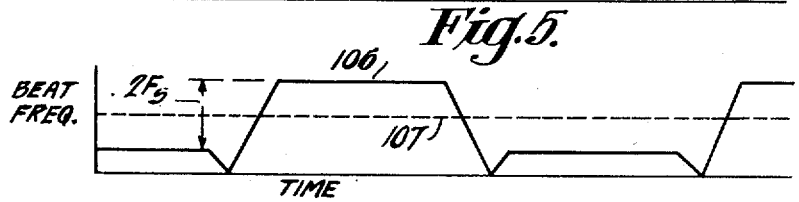
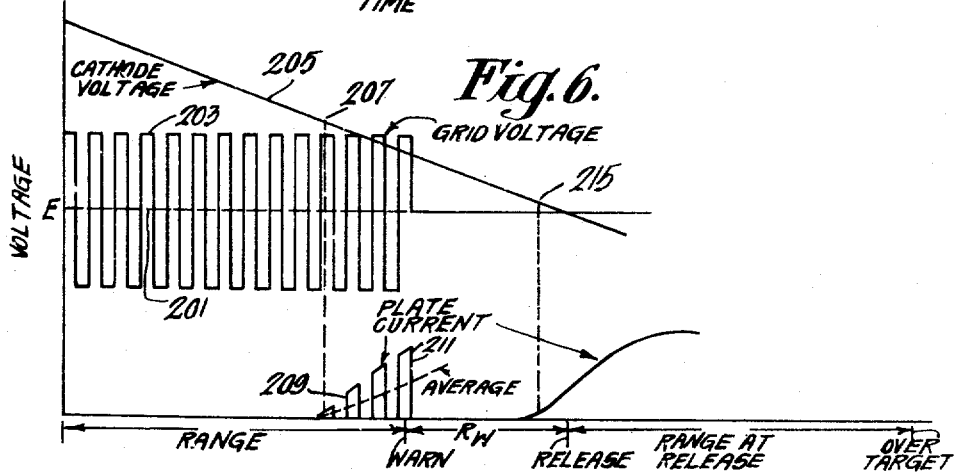
INVENTOR.
Daniel Blitz

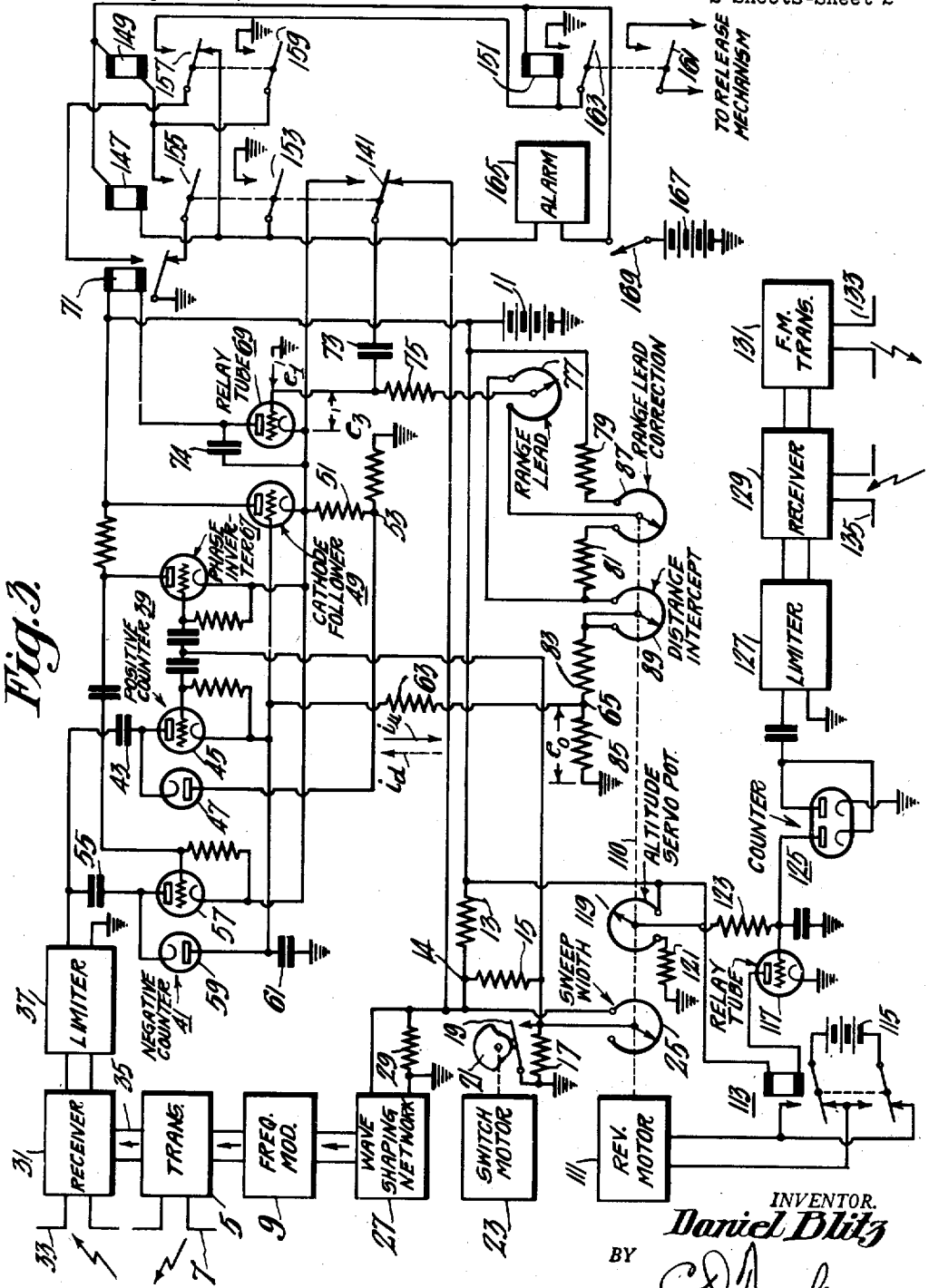

United States Patent Office 2,790,969
Patented Apr. 30, 1957

2,790,969

RADIO BOMB RELEASE WITH RANGE WARNING

Daniel Blitz, Princeton, N. J., assignor, by mesne assignments, to the United States of America as represented by the Secretary of the Navy Application April 28, 1945, Serial No. 590,850

3 Claims. (Cl. 343—7)

This invention relates to radio bomb release systems, and more particularly to improvements in systems of the type described in copending U. S. application Serial No. 524,794 filed March 2, 1944 by Royden C. Sanders, Jr. and William R. Mercer, and entitled Radio Bomb Release System and issued December 17, 1946 as Patent No. 2,412,632.

Systems of this type operate by measuring the range and speed of a bombing craft with respect to a preselected target, and effecting bomb release upon the attainment of the relationship of range and speed which will result in a hit. This relationship depends upon the altitude of the bombing craft, as described more fully hereinafter.

The system may be adjusted automatically in accordance with the altitude in order to permit the pilot to fly at any altitude within certain limits, rather than at a predetermined fixed altitude. Nevertheless it is necessary that the bomber craft be maintained in level flight at a constant altitude for a short period, of the order of one second, before the release occurs.

It has been found in practice that the pilot tends to anticipate the operation of the automatic release, releasing the bomb manually (and prematurely) under the impression that the automatic equipment has failed to function. Also, since the pilot can only guess at the time remaining until release, he is forced to cease evasive maneuvers and fly level for a period much longer than the one second required for accurate operation.

Copending U. S. patent application Serial No. 590,184 filed April 25, 1945 by Daniel Blitz and entitled Radio Devices, and issued May 18, 1948 as Patent No. 2,441,657, describes and claims a warning system which provides an indication occurring at a predetermined time, for example four seconds, before a bomb is released. Under some conditions, it is preferable to provide a warning at a predetermined distance from the release point rather than at a predetermined time. The principal object of the present invention is to provide a system of the described type including means for automatically warning the pilot that he is at a predetermined distance from the point of release.

The invention will be described with reference to the accompanying drawings wherein:

Figure 1 is a diagram showing the geometry of a bomb release problem,

Figure 2 is a graph showing the relationship of slant range to slant speed for bomb release at a particular altitude, and the linear approximation to said relationship, Figure 3 is a schematic circuit diagram of a radio bomb release system embodying the present invention, Figure 4 is a graph illustrating the variations in frequency of the signals transmitted and received in the operation of the system of Figure 3, Figure 5 is a graph illustrating the variations in frequency of the beat signal produced in the operation of the system of Figure 3, and Figure 6 is a graph showing the variations with time, as a target is approached, of the grid and cathode voltages and the anode current of the relay amplifier of the system of Figure 3.

The geometry of bomb release

Refer to Figure 1. It is assumed that an aircraft at the point P is flying horizontally at a velocity G toward a point M, directly over a target at the point Q, at an altitude H. A bomb released at the altitude H without any vertical velocity will require a time $T_f$ to fall to the level of the target.

$$(1) \qquad T_f = \sqrt{\frac{2H}{g}}$$

where $g$ equals the acceleration caused by gravity, 32.2 feet/sec.$^2$, approximately.

In order for the bomb to strike at the point Q, it must be released $T_f$ seconds before the craft reaches the point M. The time T which must elapse before the craft reaches the point M is $$(2) \qquad T = \frac{D}{G}$$

where D equals the distance from P to M.

If the horizontal speed G and the horizontal component D of the target range were known, the calculation of T would be a simple matter. The condition for release is:

$T = T_f$, or substituting (1) and (2)

$$(3) \qquad \frac{D}{G} = \sqrt{\frac{2H}{g}}$$

Radio reflection equipment does not measure the horizontal distance D, but the true or slant distance R. Similarly, the horizontal speed G is not measured directly, but its slant component S is measured. Accordingly, it is necessary to determine the time T in terms of these quantities. It is apparent from Figure 1 that at great distances or low altitudes from the target, the target depression angle $\alpha$ will be small, and the slant speed and slant range will be nearly the same as the horizontal speed and horizontal range. As the distance is decreased or the altitude increased, the differences between the slant and horizontal speeds and distances will increase.

Referring to Figure 2, the curve 1 shows the relation between slant speed S and slant range R which corresponds to one particular value of $T_1$, which in turn is the time of fall $T_f$ from an altitude $H_1$. Thus if a bomb is released from the altitude $H_1$, when R and S are of such values as to satisfy the relationship represented by the curve 1, the bomb will strik the target.

For every different altitude, there is a different relationship between R and S which must be satisfied for proper release. The curve 1 is thus but one of a family of similar curves. In the present system a linear approximation is used, rather than the actual R—S relationship. This approximation need be accurate only within the range S' and S" of slant speeds which will occur in the practical operation of the system. The dash line 3 in Figure 2 is the linear approximation to the curve 1 which produces the smallest maximum error throughout the range of slant speeds from S" to S'.

The equation of the line 3 is $$(4) \qquad R = mS + R_o$$

where $m$ is the slope of the line:

$$(5) \qquad m = \frac{R' - R''}{S' - S''}$$

and $R_o$ is the range intercept at zero speed, at indicated in

Figure 2. As stated above, the relations shown in Figure 2 correspond to one specified altitude $H_1$. For any other altitude, both $m$ and $R_o$ will have correspondingly different values. By setting in the values of $m$ and $R_o$ corresponding to the particular altitude $H$ at which a craft is flying, a substantially correct release may be obtained by satisfying the relationship of Equation 4.

*Radio system and computer circuits*

Refer to Figure 3. A radio transmitter 5 is provided with an antenna 7, and is connected to a frequency modulator 9, which may be of the type illustrated in Figure 8 of U. S. Patent 2,407,199, issued September 3, 1946 on an application filed June 29, 1940 by Irving Wolff, or any other known device for varying the frequency of operation of the transmitter 5 in accordance with the voltage applied to it. In the present illustration, the modulator 9 is energized in such manner as to provide triangular wave frequency modulation of the transmitter 1.

A D.-C. source 11 is connected across resistors 13, 15 and 17. An adjustable resistor 25 is connected across the resistor 15. A switch 19 is connected across the resistor 17, and is arranged to be cyclically opened and closed by a cam 21, continuously driven by a motor 23. This periodically changes the voltage at the junction point 14 of resistors 13 and 15 between two values which differ by an amount depending upon the setting of the resistor 25.

The point 14 is connected to a wave shaping circuit 27. The circuit 27 may be merely an integrating circuit, or may be of the type described in copending U. S. patent application Serial No. 546,537 filed July 25, 1944 by Royden C. Sanders, Jr. and entitled Wave Shaping Circuits, now Patent No. 2,403616 issued July 9, 1946. The circuit 27 converts the square wave voltage input from the point 14 to a substantially triangular wave voltage, which is applied to the modulator 9. A resistor 29 is included in the input circuit of the wave shaping circuit 27. The band width through which the frequency of the transmitter 5 is swept is determined by the adjustment of the resistor 25.

A receiver 31 is provided with an antenna 33, and is coupled to the transmitter 5 through a transmission line 35. An amplitude limiter 37 is connected to the output of the receiver 31. The output circuit of the limiter 37 is connected to a pair of frequency responsive circuits comprising averaging cycle counters 39 and 41 respectively. The counter 39 includes a capacitor 43, connected from the limiter 37 to the anode of a triode 45 and to the cathode of a diode 47. The cathode of the triode 45 is connected to the control grid of a cathode follower amplifier tube 49. The entire load resistance 51 associated with the tube 49 is connected in its cathode circuit so that it acts as a so-called "cathode follower." The anode of the diode 47 is connected to a tap 53 on the resistor 51.

The counter 41 includes a capacitor 55 connected from the limiter 37 to the anode of a triode 57 and to the cathode of a diode 59. The anode of the diode 59 is connected to the control grid of the cathode follower tube 49. The cathode of the triode 57 is connected to the upper end of the load resistor 51, at the cathode of the tube 49. The counters 39 and 41 are provided with a common storage capacitor 61, connected between the control grid of the tube 49 and ground. They also have a common load resistor 63, connected from the grid of the tube 49 to a point 65 on a voltage divider chain described hereinafter.

The control grid of the triode 45 of the counter 39 is coupled to the ungrounded end of the resistor 17, so that a square wave voltage is applied thereto in synchronism with the frequency modulation of the transmitter 5. The control grid of the triode 57 is coupled to the same point through a phase inverter 67, so that the square wave voltage applied thereto is 180° out of phase with that at the grid of the triode 45. The connections are such that the triode 57 is cut off and the triode 45 is conductive while the frequency of the transmitter 5 is increasing, and the triode 45 is cut off and the triode 57 is conductive while the transmitted frequency is decreasing.

The cathode of the cathode follower tube 49 is connected to the cathode of a relay amplifier tube 69, and also to the contact assembly 141 of a relay 147. The anode circuit of the tube 69 includes the actuating coil of a relay 71. The contacts of the relay 71 are connected to the warning system described hereinafter. The anode of the relay fuze 69 is bypassed to the cathode through a capacitor 74. The control grid of the tube 69 is connected through a resistor 75 to the adjustable contact of a variable voltage divider 77, and through a capacitor 73 to the contact assembly 141 of the relay 147. When the relay 147 is energized, the grid is coupled through the capacitor 73 to the cathode of the tube 69. When the relay 147 is deenergized the grid of the tube 69 is coupled to the point 14.

The voltage divider 77 is shunted across a portion of a voltage divider chain including fixed resistors 79, 81, 83 and 85, and variable resistors 87 and 89, serially connected across the D.-C. source 11. The voltages at the terminals of the voltage divider 77 are controlled by the variable resistors 87 and 89. The potential at the control grid of the relay tube 69 is variable between these two voltages by adjustment of the voltage divider 77. The return point 65 of the counter load resistor 63 is the junction between the fixed resistors 83 and 85.

*Operation of radio system and computer*

Assume that the relay 147 is energized, connecting the capacitor 73 between the grid and cathode of the tube 69. Owing to the cyclical operation of the switch 19 by the motor 23, the frequency of the output of the transmitter 5 varies cyclically as shown by the solid line 101 of Figure 4. Some of this output is transferred directly to the receiver 31 through the line 35. The greater portion is radiated by the antenna 7. Some of the radiated energy strikes the selected target (not shown), and is reflected to the antenna 33. The time required for the transmitted energy to travel to the target and back to the antenna 33 is proportional to the slant range R from the aircraft to the target. The variations in frequency of the received energy are accordingly delayed with respect to those of the transmitted energy. The variation of frequency of the received signal as a function of time, assuming no relative motion between the aircraft and the target, is shown by the dot line 103. The delay $T_r$ is proportional to the range R.

Now if the range is decreasing at a rate S, the frequency of the received signal will be increased, owing to Doppler Effect. Thus the frequency of the received signal will vary with time as shown by the dash line 105. The increase in frequency $F_s$ is directly proportional to the speed S.

The direct and reflected signals from the transmitter 5 are mixed and detected in the receiver 31. The output of the receiver comprises a beat frequency signal, which has a frequency equal to the difference in the frequencies of the two signals applied to the receiver. The frequency of this beat signal varies with time as shown by the solid line graph 106 of Figure 5. The mean value of the beat frequency, indicated by the dash line 107 in Figure 5, is directly proportional to the range R, and is equal to:

(6) $$\frac{f_m f_s R}{246}$$

where $f_m$ is the modulating frequency in cycles per second, $f_s$ is the sweep width, or range of variation of the transmitter frequency, in megacycles per second, and R is the slant range in feet. The beat frequency varies cyclically above and below its mean value by the amount $F_s$. During increase of transmitter frequency, the beat frequency is:

(7) $$f_u = \frac{f_m f_s R}{246} - \frac{2 f_o S}{c}$$

where $f_o$ is the mean transmitted frequency (see Figure 4) in cycles per second, $S$ is the slant speed in feet per second, and $c$ is the velocity of wave propagation (the velocity of light) in feet per second. During decrease of transmitter frequency the beat frequency is:

(8) $$f_d = \frac{f_m f_s R}{246} + \frac{2 f_o S}{c}$$

As mentioned above, the triode 57 of the counter 41 is cut off during increase of transmitted frequency, and the triode 45 of the counter 39 is conductive. During this period, the counter 39 operates to provide an average current $i_u$ through the load resistor 63 in the direction of the solid arrow. This current is:

(9) $$i_u = k_1 f_u = k_1 \left( \frac{f_m f_s R}{246} - \frac{2 f_o S}{c} \right)$$

where $k_1$ is a constant directly proportional to the capacitance of the capacitor 43. During this period the counter 41 does not operate.

During decrease of transmitted frequency, the triode 45 is cut off and the counter 39 does not operate. The triode 57 is conductive, and the counter 41 provides an average current $i_d$ through the load resistor 63 in the direction of the dash arrow. This current is:

(10) $$i_d = k_2 f_d = k_2 \left( \frac{f_m f_s R}{246} + \frac{2 f_o S}{c} \right)$$

where $k_2$ is a constant directly proportional to the capacitance of the capacitor 55. The common load capacitor 61 averages the pulsations in the voltage at the control grid of the cathode follower tube 49, so that the voltage between the cathode follower grid and ground is

(11) $$e_0 + \frac{i_u - i_d}{2} R_L = e_0 + \frac{R_L}{2} \left[ k_1 \left( \frac{f_m f_s R}{246} - \frac{2 f_o S}{c} \right) - k_2 \left( \frac{f_m f_s R}{246} + \frac{2 f_o S}{c} \right) \right]$$

where $e_0$ is the potential at the point 65 and $R_L$ is the resistance of the load resistor 63.

The cathode of the tube 49 is maintained at substantially the same potential as the control grid as long as the current through the resistor 51 is only the anode current of the tube 49. Thus the potential at the cathode of the relay tube 69 is the same as that at the grid of the tube 49. The potential at the control grid of the relay tube (referred to ground) is the voltage $e_1$ at the tap of the voltage divider 77. Thus the voltage $e_3$ between the cathode and the control grid of the relay tube is:

$$e_3 = e_0 + \frac{R_L}{2} \left[ k_1 \left( \frac{f_m f_s R}{246} - \frac{2 f_o S}{c} \right) - k_2 \left( \frac{f_m f_s R}{246} + \frac{2 f_o S}{c} \right) \right] - e_1$$

Rearranging the terms,

(12) $$e_3 = e_0 - e_1 + R f_s (k_1 - k_2) \left( \frac{R_L}{2} \cdot \frac{f_m}{246} \right) - S(k_1 + k_2) \left( \frac{R_L}{2} \cdot \frac{2 f_o}{c} \right)$$

The quantities $k_1$, $k_2$, $R_L$, $f_m$ and $f_o$ are all constants, determined in accordance with design considerations. Therefore Equation 12 can be written as:

(13) $$e_3 = e_0 - e_1 + K_1 f_s R - K_2 S$$

where $$K_1 = (k_1 - k_2)\left( \frac{R_L f_m}{2 \cdot 246} \right)$$

$$K_2 = (k_1 + k_2)\left( \frac{R_L}{2} \cdot \frac{2 f_o}{c} \right)$$

As long as $e_3$ is sufficiently large to bias the relay tube 69 to cutoff, no current flows through the relay 71 and it remains open. However, when $e_3$ becomes equal to $e_3'$, the voltage at which the tube 69 starts to conduct, the relay 71 is closed. At this time $$e_3' = e_0 - e_1 + K_1 f_s R - K_2 S$$

The slant range is therefore:

(14) $$R = \frac{K_2 S}{K_1 f_s} + \frac{e_0 - e_1 - e_3'}{K_1 f_s}$$

This may be expressed as Equation 4 above, $$R = mS + R_0$$

where

(15) $$m = \frac{K_2}{K_1 f_s}$$

and

(16) $$R_0 = \frac{e_0 - e_1 - e_3'}{K_1 f_s}$$

Thus by setting the values of $$\frac{K_2}{K_1 f_s}$$

and $$\frac{e_0 - e_1 - e_3'}{K_1 f_s}$$

in accordance with the altitude H, the relay can be made to operate at the proper release time, within the limits of the linear approximation of the corresponding $R-S$ curve.

It is apparent from Equation 15 that $m$ is inversely proportional to the bandwidth $f_s$. Accordingly, the proper value of $m$ for any particular altitude H may be obtained by adjustment of the sweep width control 25. $R_0$, as shown by Equation 16, is also inversely proportional to the bandwidth, and is directly proportional to the voltage which must be present across the counter load resistor 63 to cause the relay tube 69 to conduct. This voltage is the difference between the total bias from cathode to grid of the relay tube 69 ($e_0 - e_1$), and the cutoff bias $e_3'$, and is a function of the settings of the variable resistors 89, 87 and 77, which control the bias $e_1$ at the grid of the relay tube 69. The variable resistor 89 is employed to control $R_0$ in accordance with the altitude.

The variable resistor 77 is provided to allow variation of the bias $e_1$ on the relay tube for the purpose of obtaining an adjustable range lead, so that release may be made to occur a certain distance in advance of the target. Since the voltage required for a given range lead will vary with altitude, the variable resistor 87 is included to set the voltage across the resistor 77 as a function of altitude. Thus a given setting of the resistor 77 will provide a given range lead, regardless of the altitude.

The controls 87, 89 and 25 are ganged on a shaft 110 in order that the modulation bandwidth and the bias voltages may be adjusted simultaneously to correspond with the altitude. None of these quantities are linear functions of the altitude. The resistors 87 and 89 are designed with resistance-rotation characteristics comprising two linear portions of different slopes to provide approximately the required variations of voltage with rotation of the shaft 110. Practically, the errors introduced by this arrangement are negligible.

The modulation bandwidth must be held within about one percent of the correct value. While this could be achieved with a tapered variable resistor, there would be difficulty in constructing such a device, and it would necessarily be large in order to obtain the required accuracy. On the other hand, it is relatively easy to make a variable resistor of reasonable size having an accurately linear resistance-rotation characteristic. By proper proportioning of the resistors 13, 15, 17 and 29, the variable resistor 25 may be made linear and yet provide the correct characteristic of bandwith vs. shaft position.

Automatic altitude compensation

The shaft 110 may be set manually to a position corresponding to the altitude at which a bombing run is to be made. However, it is preferable to have the various adjustments made automatically, so that the attention of the pilot may be given to other matters. Accordingly, an altitude responsive servo system is provided for positioning the shaft 110.

A reversible motor 111 is coupled to the shaft 110, and is connected through a double-throw relay 113 to a power source 115. The actuating coil of the relay 113 is connected in the anode circuit of a relay amplifier tube 117, like the relay tube 69. The control grid of the tube 117 is coupled to a bias source comprising an adjustable voltage divider 119 connected in series with a resistor 121 across the source 11. This bias is applied to the tube 117 through a resistor 123.

The resistor 123 comprises the load resistor for a counter circuit 125. The counter 125 is connected to the output circuit of an amplitude limiter 127, which in turn is connected to the output circuit of a receiver 129. A transmitter 131, including means for cyclically varying the transmitted frequency, is coupled to the receiver 129 and is provided with an antenna 133. A similar antenna 135 is connected to the receiver 129.

The counter 125, limiter 127, receiver 129, and transmitter 131 comprise a radio reflection altimeter, and cooperate in known manner to provide a voltage across the load resistor 123 bearing a predetermined relationship to the altitude H, and in opposing polarity to the bias voltage provided by the voltage divider 119. When the algebraic sum of this voltage and the voltage at the adjustable tap of the voltage divider 119 is negative with respect to the cutoff voltage of the relay tube 117, the relay 113 is deenergized. This connects the motor to the source 115 in such polarity as to rotate the shaft 110 in the direction corresponding to increase of altitude. The tap of the voltage divider is rotated to produce more positive bias, until the voltage across the counter load resistor is neutralized. The relay tube 117 starts to conduct, energizing the relay 113 and disconnecting the motor 111 from its source 115.

The relay 113 is provided with a small "dead space" so that a slight increase of energization is required to close the upper contacts. Thus if the voltage across the counter load resistor 123 decreases, the relay will operate to its upper position, energizing the motor 111 to rotate the shaft 110 in the direction corresponding to decrease of altitude. Thus the shaft 110 is maintained substantially continuously at a position corresponding to the altitude.

Warning system

It has been assumed throughout the above description that the relay 147 has remained energized so that the bias on the relay tube 69 was adjusted to operate the relay 71 in accordance with Equation 14. This operation is typical of the systems described in the above mentioned copending patent applications, and is the final phase of the operation of the present system. Initially, however, the relays 147 and 149 are deenergized, with their contacts in the positions shown in the drawing.

The capacitor 73 is connected through the contacts 141 to the point 14, applying the square wave sweep voltage to the grid of the relay tube 69. Referring to Figure 6, the dot line 201 represents the bias voltage $e_1$ supplied to the control grid of the relay tube 69 through the resistor 75 from the range lead control potentiometer 77. Superimposed on this bias voltage is the square wave voltage 203 from the point 14 of the sweep circuit.

As indicated by Equation 11, the voltage (referred to ground potential) at the grid of the cathode follower tube, and hence that at the cathode of the relay tube 69, is initially highly positive. As the target range decreases, this voltage becomes correspondingly lower. The solid line 205 in Figure 6 represents the variation in cathode voltage as the range is uniformly decreased. The voltage $c_3$ between the cathode and the control grid of the relay tube 69 is indicated by the difference between the lines 203 and 205 on Figure 6, and varies cyclically at the sweep repetition frequency.

At the point 207, the grid of the relay tube becomes sufficiently less negative with respect to the cathode to allow a short pulse of plate current to flow, as indicated at 209 in Figure 6. During several succeeding square wave cycles, as the range decreases, plate current pulses of increasing amplitude flow. The capacitor 74 is provided to integrate these pulses into a more or less smoothly increasing current, since the inductance of the winding of the relay 71 is too great to allow the short current pulses to flow through it. When the amplitude of the plate current has increased to a sufficient value, as indicated at 211, the relay 71 is actuated. This occurs when the target range is greater by an amount $R_w$ than that at which the bomb should be released, as shown on Figure 6.

The contacts of the relay 71, instead of being connected directly to the bomb release mechanism, as in the above-mentioned systems, are connected to the system of sequentially operating relays 147, 149 and 151. An alarm device 165, which may be a lamp, a buzzer, or other indicator is connected in parallel with the actuating magnet of the relay 147. Energy for operating the alarm 165 and the relays 147, 149 and 151 is supplied by a source 167, through a manually operable switch 169.

In the operation of the system, the movable contact of the relay 71 is initially in its lower position and the relays 147, 149 and 151 are not energized. As a target is approached, the radio and computer system operates as described above, energizing the relay 71 at a target range $R_w$ greater than that predicted for release. The relay 147 and the alarm 165 are energized through the switch 169, the contact 157 of the relay 149, and the upper contact of the relay 71.

The alarm 165 starts and continues to operate throughout the bomb release period. The contacts 153 close, setting up a holding circuit for the relay 147. The contacts 141 operate to disconnect the capacitor 73 from the point 14, and to connect it to the cathode of the relay tube 69. The contact 155 is closed.

With the removal of the square wave voltage from the grid of the relay tube by the operation of the contacts 141, the grid voltage remains at the value $e_1$, which is less than the cathode voltage. The plate current of the relay tube is thus cut off, and the relay 71 is deenergized, completing a circuit through the winding of the relay 149 and contacts 155. The contacts 159 close, setting up a holding circuit for the relay 149. The contacts 157 operate to transfer the connection of the upper contact of the relay 71 to the winding of the relay 151.

Nothing further happens until the bomber craft reaches the point at which release should occur. At this time, the cathode voltage has decreased to a value approximating the bias $e_1$, as indicated at 215 in Figure 6, causing plate current to flow again. The relay 71 is energized again, closing the circuit through the coil of the relay 151 and the contacts 157. Contacts 163 close, setting up a holding circuit for the relay 151. Contacts 161 close, actuating the bomb release mechanism. The function of the relay 151 is merely to "latch" the circuit so that any momentary chattering of the relay 71 at the time of release will not cause erratic operation of the release mechanism. It is evident that the release mechanism could be connected directly to the contacts 157, and the relay 151 could be omitted.

In order for the above described warning operation to take place at a predetermined distance from the release point, the increase in the grid bias of the relay tube 69 must be set as a function of the altitude H. This function is the same as that required for the sweep width. Since the amplitude of the square wave voltage at the point 14 varies with the altitude in the required manner, no further control is necessary. A typical system of the described type will actuate the warning at a distance of about 600 feet from the release point. If it is desired to provide the warning at a shorter distance, the square wave voltage applied to the relay tube may be attenuated by known means, such as by placing a resistor of the proper value in the connection from the point 14 to the contacts 141.

This brings the point 207 of Figure 6 nearer to the release point 215, providing a smaller value of $R_w$. Conversely, the warning range may be increased by amplifying the square wave voltage, or by changing the constants of the system so that the cathode voltage 205 and the bias voltage $e_1$ are less in relation to the square wave amplitude.

The invention has been described as an improved bomb release system of the radio reflection type wherein signals radiated from an aircraft to a selected target are picked up after reflection thereby, and utilized to first provide a warning that bomb release is imminent, and to release a bomb shortly thereafter. This is accomplished by initially setting the calibration of the equipment so as to operate at a greater range than that at which release should occur. Instead of releasing the bomb, this operation activates a warning signal and simultaneously changes the calibration to the correct one for release. The equipment then operates a second time to effect the release.

I claim as my invention:

1. A radio bomb release system including, on a bombing craft, transmitter means for radiating a signal to a selected target, means for cyclically varying the frequency of operation of said transmitter means, means for receiving said signal after reflection by said target, frequency responsive means differentially responsive to the output of said receiver means during increase and decrease respectively of the frequency of said transmitter, and relay means responsive to the output of said frequency responsive means to operate upon the attainment of a predetermined magnitude of the output from said frequency responsive means, corresponding to a predetermined relationship between the distance and speed of said craft with respect to said target; means normally biasing said relay so as to cause initial operation of said relay a distance $R_w$ greater than the distance R from the target at which a bomb should be released from said craft to strike said target, further relay means responsive to said initial operation of said first-mentioned relay to alter said bias on said first relay means so as to cause a second operation of said first relay at the distance R from the target, an alarm device connected to said further relay means, and third relay means responsive to said second operation of said first relay to release a bomb.

2. A radio bomb release system including, on a bombing craft, transmitter means for radiating a signal to a selected target, means for cyclically varying the frequency of operation of said transmitter means, means for receiving said signal after reflection by said target, frequency responsive means differentially responsive to the output of said receiver means during increase and decrease respectively of the frequency of said transmitter, a relay responsive to the output of said frequency responsive means to operate upon the attainment of a predetermined magnitude of the output from said frequency responsive means, corresponding to a predetermined relationship between the distance and speed of said craft with respect to said target; means normally biasing said relay so as to cause initial operation of said relay a distance $R_w$ greater than the distance R from the target at which a bomb should be released from said craft to strike said target, means responsive to said initial operation of said relay to effect an alarm indication, a second relay responsive to said initial operation of said first relay to alter said bias on said first relay to a value such as to cause a second operation of said first relay at the distance R from the target, and means responsive to said second operation of said first relay to release a bomb.

3. A radio bomb release system including, on a bombing craft, transmitter means for radiating a signal to a selected target, means for cyclically varying the frequency of operation of said transmitter means, means for receiving said signal after reflection by said target, frequency responsive means differentially responsive to the output of said receiver means during increase and decrease respectively of the frequency of said transmitter, and relay means responsive to the output of said frequency responsive means to operate upon the attainment of a predetermined magnitude of the output from said frequency responsive means, corresponding to a predetermined relationship between the distance and speed of said craft with respect to said target; means normally biasing said relay so as to cause initial operation of said relay a distance $R_w$ greater than the distance R from the target at which a bomb should be released from said craft to strike said target, means responsive to said initial operation of said relay to effect an alarm indication and to alter said bias on said relay to a value such as to cause a second operation of said relay at the distance R from the target, and means responsive to said second operation of said relay to release a bomb.

References Cited in the file of this patent

UNITED STATES PATENTS

| | | |
|---|---|---|
| 2,399,426 | Bradley | Apr. 30, 1946 |
| 2,441,657 | Blitz | May 18, 1948 |